(12) United States Patent
Garcia et al.

(10) Patent No.: US 11,159,255 B2
(45) Date of Patent: Oct. 26, 2021

(54) BEAM SELECTION AND COMBINING FOR RADIO ACCESS NETWORK

(71) Applicant: Telefonaktiebolaget LM Ericsson (publ), Stockholm (SE)

(72) Inventors: Virgile Garcia, Antibes (FR); Ning He, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/758,667

(22) PCT Filed: Oct. 30, 2017

(86) PCT No.: PCT/CN2017/108387
§ 371 (c)(1),
(2) Date: Apr. 23, 2020

(87) PCT Pub. No.: WO2019/084722
PCT Pub. Date: May 9, 2019

(65) Prior Publication Data
US 2020/0343981 A1 Oct. 29, 2020

(51) Int. Cl.
*H04B 17/29* (2015.01)
*H04B 17/336* (2015.01)
(Continued)

(52) U.S. Cl.
CPC ........... *H04B 17/29* (2015.01); *H04B 7/0408* (2013.01); *H04B 7/086* (2013.01); *H04B 17/0085* (2013.01); *H04B 17/336* (2015.01)

(58) Field of Classification Search
CPC .... H04B 17/29; H04B 17/336; H04B 7/0408; H04B 7/086; H04B 17/0085
(Continued)

(56) References Cited

U.S. PATENT DOCUMENTS 9,509,382 B1 11/2016 Nabar et al.
9,876,549 B2 1/2018 Yu et al.
(Continued)

FOREIGN PATENT DOCUMENTS

| CN | 101867402 A | 10/2010 |
|---|---|---|
| CN | 105308881 A | 2/2016 |
| EP | 3202053 | 8/2017 |

OTHER PUBLICATIONS

International Search Report and Written Opinion dated Aug. 8, 2018 for International Application No. PCT/CN2017/108387 filed on Oct. 30, 2017, consisting of 7-pages.
(Continued)

*Primary Examiner* — Obaidul Huq
(74) *Attorney, Agent, or Firm* — Christopher & Weisberg, P.A.

(57) ABSTRACT

There is disclosed a method of operating a radio node arrangement in a radio access network. The method includes receiving signaling from a plurality of antennas, the signaling representing transmissions received by the plurality of antennas; performing a transformation of the signaling into a test beam space representation, the test beam space representation pertaining to a subset of reception beams selected from a set of reception beams; and determining a reception quality representation of the test beam space representation. The method includes, if the reception quality representation fulfils a quality requirement condition set, performing further processing based on the test beam space representation; or otherwise, amending the subset of reception beams and returning to receiving signaling and/or performing a transformation. The disclosure also pertains to related devices and methods.

20 Claims, 4 Drawing Sheets

(51) Int. Cl.
*H04B 7/0408* (2017.01)
*H04B 7/08* (2006.01)
*H04B 17/00* (2015.01)

(58) Field of Classification Search
USPC .................................... 370/310, 328, 329
See application file for complete search history.

(56) References Cited

U.S. PATENT DOCUMENTS

2014/0341310 A1    11/2014  Rahman et al.
2016/0112147 A1*    4/2016  Seo ..................... H04B 7/088
                                                         375/224
2016/0218779 A1*    7/2016  Lee ..................... H04B 7/0408
2017/0033854 A1*    2/2017  Yoo ..................... H04W 24/00

OTHER PUBLICATIONS

European Search Report and Opinion dated May 10, 2021, for corresponding European Application No. 17930815.0; consisting of 9-pages.

* cited by examiner

10

BEAM SELECTION AND COMBINING FOR RADIO ACCESS NETWORK

CROSS-REFERENCE TO RELATED APPLICATIONS

This application is a Submission Under 35 U.S.C. § 371 for U.S. National Stage Patent Application of International Application Number: PCT/CN2017/108387, filed Oct. 30, 2017 entitled "BEAM SELECTION AND COMBINING FOR RADIO ACCESS NETWORK," the entirety of which is incorporated herein by reference.

TECHNICAL FIELD

This disclosure pertains to wireless communication technology, in particular in the context of reception beam forming.

BACKGROUND

Multi-antenna systems allow transmitting signals focused towards certain spatial regions. This creates beams ("beam forming") whose coverage can go beyond transmissions using non-beamformed signals but at the cost of narrower coverage. This is a classic trade-off between distance and angular coverage.

In 5G/NR, radio devices are expected to operate with large number of antennas ("Massive MIMO"), offering flexibility and potentially very narrow beams (very large focusing gain). Massive MIMO makes a clean break with current practice through the use of a very large number of service antennas or antenna subarrays that are fully coherently and adaptively operable. It should be noted that beam forming may be performed for transmission as well as reception.

While massive MIMO renders some traditional research problems irrelevant, it uncovers entirely new problems that urgently need attention, especially related to practical considerations. In particular, the processing and hardware requirements of treating a large number of parallel data streams from many antennas are significant. Massive MIMO with dozens or hundreds of signals is in particular a major challenge for real-time processing. Combining is particularly affected by the scaling of the numbers.

Utilizing multiple antennas at the receiver allows for sampling of the signal (received electromagnetic field) over a larger antenna aperture, which increases the overall received power. Further, it allows for coherent combination of multiple copies of the received signal, and hence provides an additional receive beamforming gain in the direction of interest.

SUMMARY

Since transmitters (e.g., UEs or network nodes), and their transmitted signaling, are in general not evenly distributed evenly in space, this may provide a possibility of only processing the signals (beams) which contain valuable information. Hence, beam space processing with beam selection may provide a complexity reduction.

Combining complexity is a practical challenge. The hardware and processing capabilities are a tradeoff between cost and performance. While MMSE is a suitable combining operation, the real-time and speed requirements only allow matrices of small dimensions to be processed, as the complexity of matrix inversion is growing exponentially with the matrix size.

A transformation into beam space (providing a beam space representation) may focus the energy into fewer beams than the original signal. Selection of a subspace of the full beam space is helpful to reduce further processing, but it is hard to know beforehand the signal quality after of the combining, and whether this is enough for decoding. Keeping too many beams is computationally challenging, whereas keeping too few may reducing performance over the air interface.

It thus is an object of the present disclosure to provide approaches allowing efficient reception beam forming, in particular in the context of massive MIMO and/or utilising MMSE as a combining scheme. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is generally proposed a method of operating a radio node arrangement in a radio access network. The method comprises receiving signaling representing transmissions received by a plurality of antennas (and/or an antenna arrangement comprising a plurality of antennas). The method also comprises performing a transformation of the signaling into a test beam space representation, the test beam space representation pertaining to a subset of reception beams selected from a set of reception beams, and determining a reception quality representation of the test beam space representation. If the reception quality representation fulfils a quality requirement condition set, further processing based on the test beam space representation is performed, otherwise (if not), the method comprises amending the subset of reception beams, and returning to receiving signaling and/or performing a transformation.

There is also considered a radio node arrangement for a radio access network. The radio node arrangement is adapted for receiving signaling representing transmissions received by a plurality of antennas (and/or a corresponding antenna arrangement). The radio node arrangement further is adapted for performing a transformation of the signaling into a test beam space representation, the test beam space representation pertaining to a subset of reception beams selected from a set of reception beams. The radio node arrangement also is adapted for determining a reception quality representation of the test beam space representation. Moreover, the radio node arrangement is adapted for performing further processing based on the test beam space representation if the reception quality representation fulfils a quality requirement condition set, and, otherwise, amending the subset of reception beams and returning to receiving signaling and/or performing a transformation.

Returning to receiving signaling and/or performing a transformation may be considered to start a new iteration. For a new iteration (after a first), the subset may be the amended subset. If further processing is performed, a new process (with a first or initial iteration) may be started. Returning to receiving signaling may be performed such that an ongoing iterative process is based on new signaling, e.g. in a situation with (relatively) static transmitters and/or on very short timescales and/or with long-term allocated transmission resources. The new signaling may replace old signaling, or may be combined, e.g. averaged or weighted.

Further processing may comprise providing and/or applying the determined subset of beams and/or the beam space representation and/or associated weights or parameters, e.g. for demodulating and/or decoding and/or processing the signaling, e.g. mapping it to one or more transmissions and/or transmitters and/or channels.

A radio node arrangement may comprise, and/or be adapted for utilising, circuitry, in particular processing circuitry and/or radio circuitry, for performing the actions described herein. Processing circuitry may in particular be implemented as, and/or comprise a combiner. It may be considered that the radio node arrangement comprises, and/or is connected or connectable to, and/or may interface with, an antenna arrangement, or circuitry associated thereto, which may provide the signaling. A radio node arrangement may be implemented as a user equipment, or a network node (or may comprise such and/or be connected or connectable thereto, e.g. via a suitable interface).

Signaling representing transmissions received by a plurality of antennas may represent and/or comprise a plurality of data streams, which may be provided by antennas and/or subarrays of the antenna arrangement. The signaling may be indexed and/or synchronized and/or timed to allow reception beamforming. It may be considered that the signaling represents an electromagnetic/radio field received by the antennas/antenna arrangement, e.g. based on one or more preprocessings, e.g. amplification and/or filtering and/or sampling and/or transformations, e.g. into frequency space, and/or digitization, e.g. utilising ADC technology. Received transmissions may be transmitted, e.g. over an air interface and/or as radio transmissions, by one or more transmitters. The transmissions may be scheduled, e.g. by a network and/or radio node or the radio node arrangement. However, in some cases, scheduling may be performed by another radio node, e.g. if the radio node arrangement is a user equipment. The signaling may be provided via a suitable communication interface or circuitry, e.g. via cable or in some cases even via an air interface, for example a backhaul link.

The set of reception beams may be predefined and/or configured and/or fixed, e.g. based on location of the radio node arrangement. The subset may be configured and/or be predefined. An initial subset of beams may be predefined and/or configured or configurable. It may be stored in memory, e.g. in addition to the set of beams. The initial subset may comprise a small number of beams, e.g. equal to or at most ¼, or ⅓, or ½ of the number of the beams of the set. The beams of the initial subset may be beams with large spatial angle and/or coverage area (compared to other beams of the set) and/or a suitable direction distribution, e.g. based on utilising a small number of antenna elements or subarrays. Determining a subset may comprise, and/or be based on, determining the signal strength of one or more beams (for example by measuring), e.g. based on the signaling, and/or for an ongoing iteration or one or more preceding iterations, or a combination thereof. Determining a subset may be determined based on scheduling information and/or Quality of Service (QoS) information, which may be related to a service and/or channel and/or transmitter (user) and/or a bearer. QoS information may generally indicate service type and/or priority and/or latency and/or data rate and/or channel quality and/or error occurrence.

A beam space representation may be considered to represent the signaling (respectively the transmissions) in a space spanned and/or defined and/or represented by the beams of the subset. Using a beam space allows efficient handling in particular for a large number of different possible beams. Performing a transformation of signaling into a beam space representation may comprise one or more pre-processing and/or intermediate processing actions or procedures, e.g. filtering, and/or performing estimation and/or calculation and/or manipulation and/or combining. The beam space representation may in some cases provide spatial filtering (e.g., discarding transmission components not associated to a beam of the subset) and/or associate signaling or received transmission components to the beams of the subset.

A reception quality representation generally may indicate, and/or be based on, estimation and/or determination of one or more parameters of the representation (e.g., measuring and/or processing signaling and/or performing calculations based thereon). The representation may pertain, and/or comprise one or more parameters. It may be considered that the representation and/or a parameter thereof pertains to one or more channels and/or carriers and/or bandwidths (or bandwidth parts).

The beam space representation and/or the reception quality representation may pertain to all of the signaling, or to one or more specific components of the signaling, e.g. a particular frequency range/bandwidth/subcarrier range, and/or channel, and/or amplitude, and/or specific transmission or reception resources (in particular in time domain). Specific resources may be associated to specific channels, e.g. control channel. In some cases, the representation/s may pertain to reference signaling included in the transmissions, e.g. pilot signaling and/or DMRS (Demodulation Reference Signaling) and/or sounding signaling, e.g. SRS (Sounding Reference Signaling). This may limit the necessary amount of calculations. It may be assumed that the radio node arrangement may be informed about the scheduling of the signaling, and/or the structure of scheduled signaling. Thus, extraction of specific components may be facilitated. The information may be provided by the network, e.g. a network node, and/or be determined by the radio node arrangement. In some cases, the radio node arrangement may be implemented as, or associated to, a corresponding network node. Thus, the information may be easily provided, e.g. utilising suitable interfaces.

The reception quality representation may represent a channel quality, in particular a SINR and/or SIR and/or SNR, and/or a set comprising more than one thereof, e.g. for different channels and/or transmissions and/or carriers and/or transmitters.

Alternatively, or additionally, the reception quality representation may represent error occurrence. Error occurrence may indicate the presence of error, e.g., in decoding, and/or an error rate, e.g. BER and/or BLER. The representation may represent a plurality of different error occurrences and/or types of error occurrences.

The reception quality representation may be determined based on scheduling information pertaining to the transmissions, e.g. based on MCS information and/or allocation information, which may indicate resources and/or transmitter/s and/or channels and/or format of transmissions. Scheduling information may generally indicate grant information, e.g. for uplink transmission by the transmitter/s, and/or QoS information and/or MCS information. Such information may generally indicate one or more QoS requirements and/or the MCS for a transmission and/or transmitter and/or service.

Generally, the quality requirement condition set may comprise one or more parameters and/or conditions, in particular threshold/s and/or target value/s, e.g. for error occurrence and/or channel quality. The quality requirement condition set may represent and/or comprise parameter/s corresponding to the parameters of the reception quality representation. Whether the representation fulfils the condition set may be checked in one or more actions and/or devices, and/or some condition/s may be checked only if one or more others are fulfilled. For example, error occurrence may be checked after a SINR condition. Determining one or more parameters of the representation may in some cases be conditional on one or more condition being fulfilled. For example, error occurrence may in some cases be determined for the reception quality representation only if a channel quality like SINR fulfills an associated condition. A condition may be fulfilled if an associated parameter of the reception quality representation reaches a prescribed threshold (e.g., for SINR), or does not reach it (e.g., for BLER or BER), depending on the threshold.

In some cases, the quality requirement condition set may be adaptable, e.g. time-dependent and/or configurable and/or amendable. For example, the quality requirement condition set may be adaptable based on a parameter of the reception quality representation not fulfilling a condition of the condition set. In particular, a channel quality parameter like SINR or SNR or SIR threshold may be adapted, e.g. increased, based on error occurrence. In some examples, the SINR may be increased if an error in decoding has been detected, e.g. based on CRC. The radio node arrangement may be adapted for such adapting.

Performing a transformation (of the signaling) may comprise combining different components of the signaling based on a combining scheme. The different components may pertain to different antennas or antenna subarrays, and/or different beams and/or be phase-based and/or timing-based. The combining scheme may be matrix-based. In some variants, the combining scheme is a MMSE or MRC scheme.

Performing a transformation of the signaling may in particular be based on combining information pertaining to an earlier performed transformation. The combining information may represent and/or comprise one or more parameters, e.g. weights, and/or matrix elements, and/or matrices, which may have been used for determining a beam space representation of signaling before. The combining information may be stored in a memory. It may be considered that the combining information comprises information pertaining to one or more earlier iterations.

It may be considered that performing a transformation of the signaling may comprise determining combining weights.

In some variants, performing a transformation of the signaling may comprise determining combining weights for a subset of beams based on combining weights for a different subset of beams, which may in particular a subset of an earlier iteration. The weights may be stored.

There is also considered a program product comprising instructions causing processing circuitry to control and/or perform a method as described herein.

Also, a carrier medium arrangement carrying and/or storing a program product as described herein is described.

Beamforming may generally comprise utilising independently controllable antenna elements and/or arrays (or sub-arrays/panels), which may be associated to an antenna arrangement, to produce a directed beam of radiation (for transmission), or to provide a (directional and/or angular, in particular regarding spatial angle) cut-out of an incoming radiation field according to a reception beam, e.g. based on timing and/or phase. A beam may have complicated shape, e.g. it may be multi-lobed, and/or irregular, depending on the number of antenna elements/arrays used for defining it. Reception beamforming may be performed by beamforming circuitry, which may be adapted therefor, and/or may be performed on based on a total receives signal or received radiation field. Depending on implementation, beamforming circuitry may be processing circuitry, and/or antenna circuitry and/or radio circuitry, or implemented separately. An antenna arrangement may comprise a plurality of different antenna elements and/or arrays (or subarrays, e.g. panel/s), which may be independently controllable. Being independently controllable for reception beamforming may be considered to comprise and/or represent that signals representing a received radiation field (e.g., output by an ADC and/or amplifier of associated to the antenna element or array) may be handled (evaluated) independent from signals from other such devices, which may be associated to different array/s and/or antenna element/s. Reception beamforming may comprise a beam space transformation, in which signals from an antenna arrangement, in particular from different independently controllable antenna elements or subarrays or arrays are mapped to define a set of beams in a beam space representation. An antenna arrangement may comprise at least 10, at least 20, at least 50 or at least 70 independently controllable antenna elements or arrays or subarrays, e.g. panels. In some variants, antenna elements may be configurably associated to (different) subarrays. Signals from different antenna elements and/or subarrays or arrays may be combined in different ways, according to a combining scheme, e.g. for beam forming and/or spatial transformation.

Different beams may differ in topology and/or shape and/or angular and/or spatial extension and/or direction and/or size, e.g. cross-section or largest area projection (e.g., at a specified distance/range) and/or regarding to resources, in particular time and/or frequency resources. Different beams in some cases may overlap, e.g. in angular/spatial extension, and/or time/frequency, or be completely distinct. It may generally be considered that beams of the set are time-shifted, e.g. within the same transmission timing structure, like a transmission time interval or and/or slot or subframe. It should be noted that due to multi-path propagation, signaling from a transmitter may be received in different beams, even if they do not overlap. Different beams or their characteristics may be associated to different antenna elements and/or subarrays, and/or different number of antenna elements/antennas used for forming them.

A subset of beams may be the set itself, or a subset smaller than the set, and/or containing and/or consisting of not all beams of the set. The subset thus may be considered a true subset or limited subset of the set. Selecting a subset, e.g. to perform further processing, may be considered a form of beam selection. Beam selection may generally be considered a form of compression, e.g. spatial compression.

Amending the subset may comprise exchanging one or more beams of the subset for one or more beams of the set not yet comprised in the subset, and/or adding one or more beams to the subset (from the beams in the set), and/or removing one or more beams from the subset. In some variants, each amendment to the subset may keep the number of beams at least constant (or increase it), and/or may keep the area and/or horizontal angle and/or vertical angle and/or spatial angle covered by the beams of the subset at least constant (or increase it/them), e.g., per direction and/or in total (e.g., covering at least the same, or replacing coverage in on area/angle with coverage in another area/angle).

The set of beams may comprise a plurality of beams, in particular 2 or more, 4 or more, 8 or more, 10 or more, 12 or more, 16 or more, or 20 or more, or 50 or more beams. The set may pertain to a specific time interval, and/or comprise beams used in and/or defined and/or configured for that interval, e.g. a transmission time interval and/or a transmission timing structure. A beam, or the set of beams, may change over time, e.g. in the time interval, e.g. due to beam switching and/or beam sweeping. The time interval may, for example, be a transmission timing structure. The set of beams may comprise reception beams defined or formed by (reception) beamforming. The set of reception beams may be defined, e.g. based on location of the receiving radio node, and/or may be configured or configurable, e.g. during operation. During operation, it may not be necessary or efficient to use all beams for further processing, such that a selection out of the set may be useful.

The subset of beams may represent an ordered list of the beams, e.g. according to signal strength and/or direction and/or spatial angle and/or horizontal angle and/or vertical angle and/or coverage. The subset may in some cases represent the N beams with the strongest signal strength, wherein N may be changed (e.g., amended) for a new iteration, e.g. increased by M, wherein M may be 1 or larger than one. M may be pre-defined (e.g., as default value) and/or configurable, e.g. based on the reception quality representation and/or a comparison of the reception quality representation with the quality requirement condition set.

Amending the subset may comprise increasing the number of beams, in particular adding one or more beams. Amending may be performed based on beam direction and/or number of transmitters and/or location of transmitters and/or difference between one or more parameters of the reception quality representation and associated conditions/thresholds, Checking a condition of the condition set, and/or comparing the reception quality representation with the condition set, may comprise comparing one or more parameters of the representation with one or more associated conditions, e.g. thresholds or target values.

BRIEF DESCRIPTION OF THE DRAWINGS

The drawings are provided to illustrate concepts and approaches described herein, and are not intended to limit their scope. The drawings comprise.

DETAILED DESCRIPTION

A joint combining and beam space sub-selection algorithm is proposed. In one variant, a combiner (unit or device or module for combining) takes a subset of beams as input, and provides estimated SINR as output. If the SINR is not sufficient (e.g., for a given MCS to be decoded), the beam selection will provide additional beams to be processed, until the SINR is good enough or the complexity becomes too high. Approaches to avoid recomputation of the all matrix elements for combining at every step are also proposed, which may limit the iterative complexity. The approaches described facilitate reducing the complexity of the combiner and allow focusing the processing where it is necessary. This allows to automatically adjust the number of beams to be selected while aiming at a SINR that is good enough for decoding performance.

An exemplary approach suggests joint, iterative beam selection and combining, e.g. in a radio node arrangement, e.g. a common unit (joint unit), which may comprise several subunits, or distributed over several different units. The approaches are illustrated in the context of a radio node arrangement that may in particular be a network node. However, they are applicable for user equipments as well, if they comprise sufficient processing power and a suitable antenna arrangement.

Figure 1:
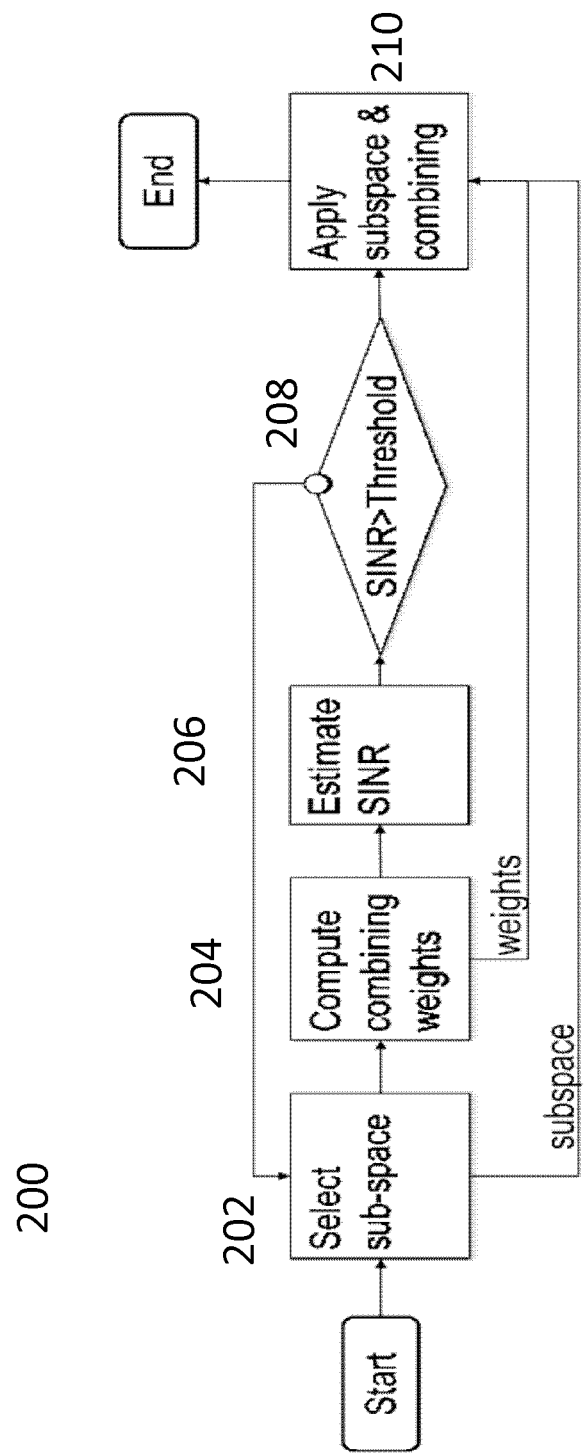
FIG. 1, showing an exemplary radio node arrangement and associated algorithm.

An exemplary radio node arrangement 200 is shown in FIG. 1. The radio node arrangement 200 may be connected or connectable to an antenna arrangement, and/or incorporate such. An input interface may be provided to receive signaling representing received transmission, e.g. from the antenna arrangement and/or circuitry processing signaling from the antenna arrangement (indicated as start in FIG. 1). The radio node arrangement 200 may in general take a set of beams and/or channel estimations as input (which may be considered to represent signaling), and may provide a subset of beams (e.g., in the form of an estimation or representation or parametrisation) as well as combining weights as output, e.g. for further processing. The radio node arrangement 200 may comprise a sub-space selection unit 202, which may choose a subset of the beams to be further processed. A combining unit 204 may, e.g. based on the subset of beams and the signaling input, compute combining weights to provide a beam space representation, which may be considered a test beam space representation. A reception quality unit 206 (implemented, e.g. an estimation unit) may determine a SINR estimation (as an exemplary reception quality representation), which may for example be computed based on the weights and input sub-space and/or the signaling. An evaluation unit 208 may evaluate the SINR estimation, e.g. compare one or more SINR estimates with associated threshold/s. Such threshold/s may indicate whether the SINR is sufficient to allow decoding of the received transmissions. The threshold/s (which may be considered to represent a quality condition set) may be determined e.g. based on a grant allocation (allocating resources for the transmission to the one or more transmitters), and especially the MCS used, for the transmission. Scheduling information indicating the grant allocation (or scheduling grant) and/or the MCS for transmission/s for one or more transmitters and/or channels and/or carrier may be provided to the radio node arrangement, e.g. by a scheduler, which may be implemented in the arrangement or be separate thereof, via a suitable interface, for example an interface of or to the evaluation units 208. The evaluation unit 208 generally may perform a check whether the estimated SINR is enough to decode one or more packets associated to the received transmissions. If not, the operation may loop back to the subspace selection, which may e.g. increase the number of beams (of the subset) to be processed, or change (amend) the subset otherwise. Otherwise, it may be finalized by providing and/or applying the weights and/or subspace for further processing (e.g., in a combiner unit 210), e.g. for decoding the signals of the received transmissions and/or on the original beams. Corresponding information may be provided via an end/output interface.

Figure 2:
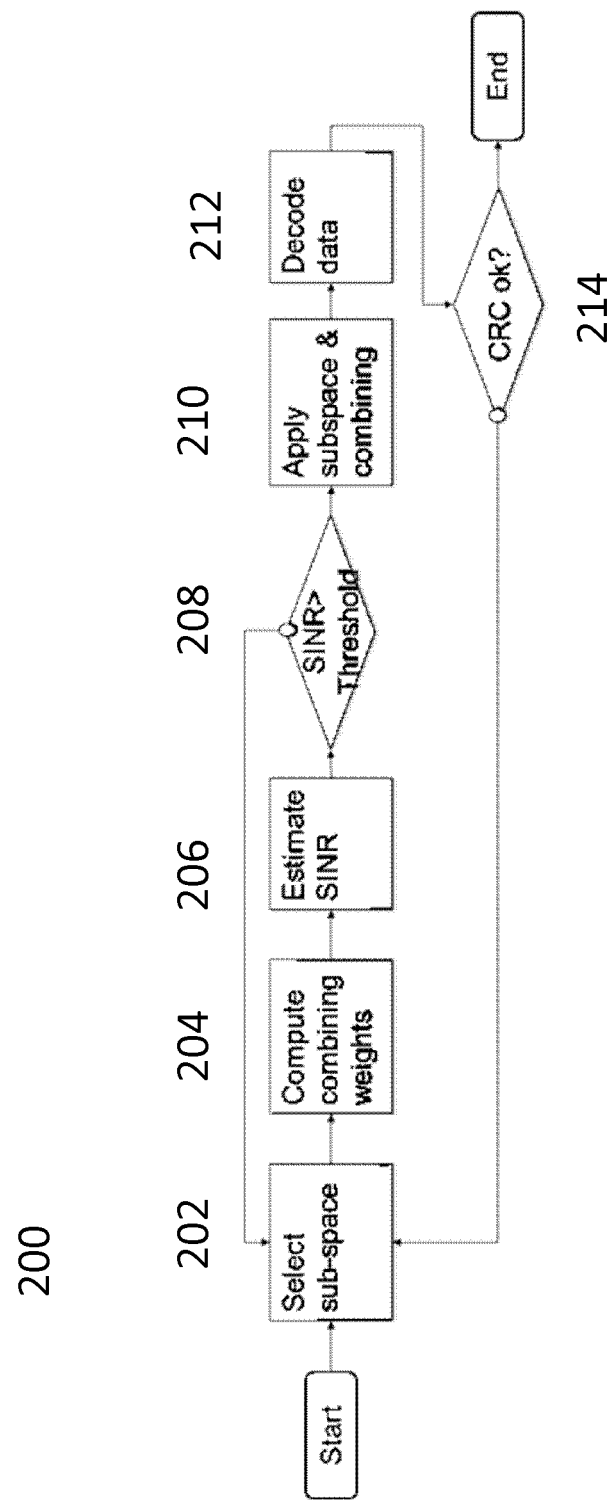
FIG. 2, showing another exemplary radio node arrangement and associated algorithm.

In a variant of the radio node arrangement 200 shown in FIG. 2, a decoding unit 212 may be included, which may perform decoding (and possibly demodulation) of the signaling, and/or map signaling to information and/or channels and/or individual transmissions and/or transmitters. In an error checking unit 214, which may be implemented in the decoding unit 212, it may be checked whether decoding was performed correctly or correctly enough, e.g. based on error detection related to error detection coding like CRC, and/or a threshold error rate like BER and/or BLER. If the decoding failed (e.g. the CRC check is not correct), the processing can go back to the sub-selection space, and/or increase the SINR threshold used.

A radio node arrangement may comprise processing circuitry, which may be arranged in one device, or distributed over several, which may be connected via interfaces.

Numerous different ways of subspace preparation and selection, which may be considered to represent selection or configuration an initial subset of beams or amending the subset, may be considered. In particular, such may comprise sorting and/or prioritising beams, e.g. to amend the subset or to select the starting subset. For example, total/maximum beam number limitations may be considered, and/or beam direction, and/or location and/or movement of transmitters, and/or channel estimates (e.g., representing signal strength of a beam), and/or QoS information, and/or hardware limitations like number of antennas and/or subarrays and/or signaling rate capabilities.

One example of beam selection and ordering may comprise to sort beams, and/or select a number of beams based on, the joint received strength of users' channel estimates on these each beams (Sort($\Sigma_i \|h_{i,j}\|^2$) assuming $h_{i,j}$ is the channel estimate of user i on beam j) in descending order (strongest to weakest beams). Then the selection of N beams may be done taking the N strongest beams. N may be increased from a suitable starting value for each iteration amending the subset.

The beam selection may prepare an ordered list of beams, and can provide a subset containing a specific given number of beams.

The ordered list may be maintained as long as the joint selection-combining is not completed, to avoid recalculation. The initial number of beams to be selected may be set by default, or changed, e.g. based on history or importance of service/quality of service requirements, e.g. regarding latency.

In some cases, every time the loop requests a beam number increase (increases the number of beams in the subset), the subspace selection may adds a number of beams to the previous subset. The number of beams to be added can be fixed, and/or set by a configuration (e.g related to hardware implementation and/or computing capabilities).

Alternatively, or additionally, it may dynamically be defined or definable or configurable (e.g., deviating from a fixed preconfiguration), for example based on a difference between quality representation (e.g., the SINR estimation) and the quality condition set (e.g., required SINR threshold). Dynamic numbers may be bounded by hardware and processing configurations.

The sub-selection generally may be constrained by practical limitations, e.g. the maximum allowed number of beams (absolute or fraction of the total), due to processing or HW limitations.

Recursive weight computing is discussed in some detail in the following. Computing MMSE or IRC weights for combining is computationally costly, as it involves matrix inversions, whose complexity scales with the square of the size of the matrix.

Using a recursive approach may be considered. In particular, it may be considered using specific or simplified computations to reuse already computed weights, which means that the may combiner (or more generally, the radio node arrangement) must store and maintain the combining weights as long as the joint selection-combining is not completed.

For instance, a simplified operation to reuse computed weights is to stack the inversed matrices diagonally at each iterative step:

At step i, using the $N_i$ newly selected beams, the combiner computes the $W_i$ matrix whose dimensions are $N_i * N_i$.

Then, all the weight matrices obtained so far may be combined in a diagonal $$W_{iterative}^{-1} = \begin{pmatrix} W_0^{-1} & 0 & \cdots & 0 \\ 0 & W_1^{-1} & \cdots & \vdots \\ \vdots & \vdots & \ddots & \vdots \\ 0 & \cdots & \cdots & W_n^{-1} \end{pmatrix}$$

Computing full matrix inversion is also possible reusing the previously computed partial inversions, using techniques like blockwise inversion. In such a technique, new dimensions are added in the matrix to be inverted. Assuming a block matrix with a LDU decomposition, its inversion may be decomposed as:

$$\begin{bmatrix} A & U \\ V & C \end{bmatrix}^{-1} = \begin{bmatrix} I & A^{-1}U \\ 0 & I \end{bmatrix}^{-1} \begin{bmatrix} A & 0 \\ 0 & C - VA^{-1}U \end{bmatrix}^{-1} \begin{bmatrix} I & 0 \\ VA^{-1} & I \end{bmatrix}^{-1}$$

$$= \begin{bmatrix} I & -A^{-1}U \\ 0 & I \end{bmatrix} \begin{bmatrix} A^{-1} & 0 \\ 0 & (C - VA^{-1}U)^{-1} \end{bmatrix} \begin{bmatrix} I & 0 \\ -VA^{-1} & I \end{bmatrix}$$

$$= \begin{bmatrix} A^{-1} + A^{-1}U(C - VA^{-1}U)^{-1}VA^{-1} & -A^{-1}U(C - VA^{-1}U)^{-1} \\ -(C - VA^{-1}U)^{-1}VA^{-1} & (C - VA^{-1}U)^{-1} \end{bmatrix}$$

The block matrix $A^{-1}$ may be reused from the previous iteration. Accordingly, the required number of operations is comparatively low. At an iteration step i, the final weight matrix computed for step i-1 will be A and the newly added dimensions are in U, V and C matrices of the previous computation.

A grant based SINR check may be performed, considering that a SINR target (threshold or multiple threshold, e.g. for different transmitters and/or channels and/or carriers) may be known in radio node arrangement. This can be achieved for example by providing scheduling information, e.g. by the scheduler and/or a link adaptation unit, which may send the SINR target/s, and/or the grant information. The grant information may indicate the MCS allocation. Based on BLER to SINR mapping data for each MCS, the joint unit/radio node arrangement may determine the target SINR/s. A MCS to SINR threshold mapping may be set according to application or traffic/QoS requirement (e.g. for a given BLER target of the traffic). Alternatively, or additionally, the MCS to SINR threshold mapping/conversion may be space and/or subspace dependent (e.g., dependent on the subset). Different lookup tables may be used at each stage of the iterative process for each subset or for different groups of subsets.

The SINR threshold may be dynamically adjusted if a previous attempt was not successful while satisfying a defined threshold (e.g. if the decoding fails, one can restart with higher SINR threshold target).

The SINR estimated (e.g. using SNR=WH(WCW$^H$)$^{-1}$, C being the estimated covariance matrix) may be compared to the SINR target, and if the target is not reached, the process can loop back to the subspace selection and try again, e.g. with a different subset of beams.

An escape out of the described loop can be performed, e.g. if the computation time is excepted to break real-time requirements, and/or if the sub-space remaining is not good enough, and/or after a given number of iterations. If an escape is performed, a default subset of beams may be used, e.g. the full set, or a predefined smaller subset.

It is generally suggested to combine receiver combining and beam selection. This joint selection aims at minimizing the number of processed streams of data/signaling, while satisfying a desired signal quality target. The target may be set based on the scheduling information (e.g. MCS) provided to the joint combining/beam selection. Additionally, the iterative computation may be simplified by storing temporary or partial computation information that can be reused in a future iteration.

The processes described herein may be performed in real-time, e.g. pertaining to a given transmission timing structure, which may in particular be a subframe or slot, or in some cases a frame.

Figure 3:
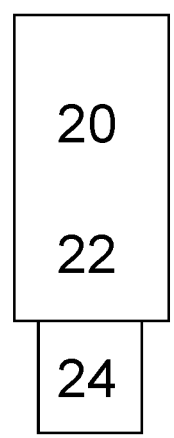
FIG. 3, showing an exemplary radio node arrangement implemented as user equipment.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules. The radio node may be considered an example of a radio node arrangement.

Figure 4:
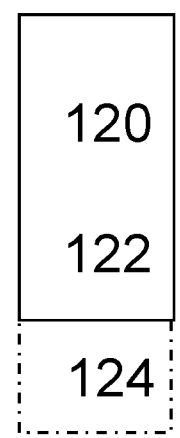
FIG. 4, showing an exemplary radio node arrangement implemented as network node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment. The radio node may be considered an example of a radio node arrangement.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes and/or radio node arrangements as described herein, in particular a network node and a user equipment, is described. The system may be a wireless communication system, and/or provide and/or represent a radio access network.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling, e.g. radio signaling, and/or transmissions may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered. An antenna arrangement may be adapted for reception beamforming and/or transmission beamforming. A beam may be a transmission beam or a reception beam. A transmission beam from a transmitter may be paired with a reception beam to form a beam pair.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays and/or an antenna arrangement. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules and/or units and/or devices disclosed herein may be implemented in software and/or firmware and/or hardware. Different modules/units/devices may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node.

Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A scheduling grant (e.g., uplink grant) may represent control signaling (e.g., downlink control information/signaling). It may be considered that a scheduling grant configures the signaling resource range and/or resources for uplink (or sidelink) signaling and/or MCS for such signaling or transmissions, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the transmission. A scheduling grant may generally indicate uplink resource/s and/or an uplink channel and/or a format (e.g., MCS) for transmission. Both grant and assignment/s may be considered (downlink or sidelink) control information, and/or be associated to, and/or transmitted with, different messages.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat request |
| BER | Bit Error Rate |
| BLER | Block Error Rate |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDM | Frequency Division Multiplex |

-continued

| Abbreviation | Explanation |
|---|---|
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MMSE | Minimum Mean-Square Error |
| MRC | Maximum-ratio combining |
| MRT | Maximum-ratio transmission |
| MU | Multi-User |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a radio node arrangement in a radio access network, the method comprising
receiving signaling from a plurality of antennas, the signaling representing transmissions received by the plurality of antennas;
performing a transformation of the signaling into a test beam space representation, the test beam space representation pertaining to a subset of reception beams selected from a set of reception beams;
determining a reception quality representation of the test beam space representation; and
performing processing based on the test beam space representation if the reception quality representation fulfils a quality requirement condition set, and otherwise, amending the subset of reception beams and returning to at least one of receiving signaling and performing a transformation.

2. The method according to claim 1, wherein the reception quality representation represents a channel quality.

3. The method according to claim 2, wherein the reception quality representation is determined based on scheduling information pertaining to the transmissions.

4. The method according to claim 1, wherein the reception quality representation represents error occurrence.

5. The method according to claim 1, wherein the reception quality representation is determined based on scheduling information pertaining to the transmissions.

6. The method according to claim 1, wherein the quality requirement condition set is adaptable.

7. The method according to claim 1, wherein performing a transformation comprises combining different components of the signaling based on a combining scheme.

8. The method according to claim 1, wherein performing a transformation of the signaling is based on combining information pertaining to an earlier performed transformation.

9. The method according to claim 1, wherein performing a transformation of the signaling comprises determining combining weights.

10. The method according to claim 1, wherein performing a transformation of the signaling comprises determining combining weights for a subset of beams based on combining weights for a different subset of beams.

11. A radio node arrangement for a radio access network, the radio node arrangement being configured to:
receive signaling from a plurality of antennas, the signaling representing transmissions received by the plurality of antennas;
perform a transformation of the signaling into a test beam space representation, the test beam space representation pertaining to a subset of reception beams selected from a set of reception beams;
determine a reception quality representation of the test beam space representation; and
perform processing based on the test beam space representation if the reception quality representation fulfils a quality requirement condition set, and otherwise, amend the subset of reception beams and returning to at least one of receiving signaling and performing a transformation.

12. The device according to claim 11, wherein the reception quality representation represents a channel quality.

13. The device according to claim 11, wherein the reception quality representation represents error occurrence.

14. The device according to claim 11, wherein the reception quality representation is determined based on scheduling information pertaining to the transmissions.

15. The device according to claim 11, wherein the quality requirement condition set is adaptable.

16. The device according to claim 11, wherein performing a transformation comprises combining different components of the signaling based on a combining scheme.

17. The device according to claim 11, wherein performing a transformation of the signaling is based on combining information pertaining to an earlier performed transformation.

18. The device according to claim 11, wherein performing a transformation of the signaling comprises determining combining weights.

19. The device according to claim 11, wherein performing a transformation of the signaling comprises determining combining weights for a subset of beams based on combining weights for a different subset of beams.

20. A non-transitory computer storage medium storing an executable computer program having instructions that, when executed, cause processing circuitry to at least one of control and perform a method of operating a radio node arrangement in a radio access network, the method comprising
receiving signaling from a plurality of antennas, the signaling representing transmissions received by the plurality of antennas;
performing a transformation of the signaling into a test beam space representation, the test beam space representation pertaining to a subset of reception beams selected from a set of reception beams;

determining a reception quality representation of the test beam space representation; and performing processing based on the test beam space representation if the reception quality representation fulfils a quality requirement condition set, and otherwise, amending the subset of reception beams and returning to at least one of receiving signaling and performing a transformation.

\* \* \* \* \*